United States Patent
Fujita et al.

(10) Patent No.: US 9,144,006 B2
(45) Date of Patent: Sep. 22, 2015

(54) MULTI-HOP COMMUNICATION TERMINAL, MULTI-HOP COMMUNICATION SYSTEM, AND MULTI-HOP COMMUNICATION METHOD

(71) Applicant: FUJITSU LIMITED, Kawasaki-shi, Kanagawa (JP)

(72) Inventors: Hiroshi Fujita, Yokosuka (JP); Kazuyuki Ozaki, Yokohama (JP); Yun Wen, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 227 days.

(21) Appl. No.: 14/017,843

(22) Filed: Sep. 4, 2013

(65) Prior Publication Data
US 2014/0140229 A1 May 22, 2014

(30) Foreign Application Priority Data
Nov. 16, 2012 (JP) .................. 2012-252595

(51) Int. Cl.
*H04W 40/08* (2009.01)
*H04W 40/22* (2009.01)

(52) U.S. Cl.
CPC .............. *H04W 40/08* (2013.01); *H04W 40/22* (2013.01)

(58) Field of Classification Search
None
See application file for complete search history.

(56) References Cited

U.S. PATENT DOCUMENTS

| | | | |
|---|---|---|---|
| 2006/0023677 A1* | 2/2006 | Labrador et al. | 370/338 |
| 2008/0055068 A1* | 3/2008 | Van Wageningen et al. | 340/539.3 |
| 2008/0316052 A1* | 12/2008 | Ruffini | 340/901 |
| 2009/0003272 A1* | 1/2009 | Payne et al. | 370/329 |
| 2013/0083722 A1* | 4/2013 | Bhargava et al. | 370/315 |
| 2014/0126546 A1* | 5/2014 | Sato et al. | 370/332 |
| 2014/0177483 A1* | 6/2014 | Jones et al. | 370/278 |
| 2015/0057011 A1* | 2/2015 | Di Girolamo et al. | 455/454 |

FOREIGN PATENT DOCUMENTS

| | | |
|---|---|---|
| JP | 2003-124876 | 4/2003 |
| JP | 2011-146850 | 7/2011 |
| JP | 2011-254191 | 12/2011 |

* cited by examiner

*Primary Examiner* — Chirag Shah
*Assistant Examiner* — Amar Persaud
(74) *Attorney, Agent, or Firm* — Fujitsu Patent Center

(57) ABSTRACT

In a gateway (GW), when interference is detected by an interference detection unit, a frame generation unit sends an interference broadcast signal. A terminal receives the interference broadcast signal sent at a maximum transmission power from the GW to which the terminal belongs. The interference broadcast signal includes information on a planned transmission power value that is a transmission power value of a data signal in the GW and is smaller than the maximum transmission power value. The interference broadcast signal is sent at the maximum transmission power value.

4 Claims, 9 Drawing Sheets

MULTI-HOP COMMUNICATION TERMINAL, MULTI-HOP COMMUNICATION SYSTEM, AND MULTI-HOP COMMUNICATION METHOD

CROSS-REFERENCE TO RELATED APPLICATION(S)

This application is based upon and claims the benefit of priority of the prior Japanese Patent Application No. 2012-252595, filed on Nov. 16, 2012, the entire contents of which are incorporated herein by reference.

FIELD

The embodiments discussed herein are related to a multi-hop communication terminal, a multi-hop communication system, and a multi-hop communication method.

BACKGROUND

In recent years, sensor networks have been more and more used for the purpose of monitoring various types of information for managing residential environment, nature conservation, healthcare, traffic conditions, etc. In a sensor network, sensors having a communication function (may be called "sensor terminals" hereinafter) are disposed at various places, and the sensor terminals autonomously constitute the network. Each of the sensor terminals wirelessly communicates with surrounding sensor terminals using a random access method. A carrier sense multiple access/collision avoidance (CSMA/CA) method is an example method for the random access communication. Each of the sensor terminals identifies a terminal to which data is to be sent (that is, a relay terminal) among the surrounding sensor terminals according to a certain method for selecting a communication route, and thus selects a communication route. The sensor terminals in the sensor network constitute a wireless multi-hop network in this manner. The wireless multi-hop network is a wireless network in which each node has a function to transfer data, and nodes that are impossible to directly communicate with each other can communicate via a relay node. Each of the sensor terminals sends data to a destination device using multiple hops. The wireless multi-hop network is sometimes called an ad-hoc network.

Here, in the CSMA/CA method, before starting communication, each of the nodes performs carrier sensing to monitor a received signal strength indication (RSSI). When the detected RSSI is less than a certain value, or the RSSI is not detected, each of the nodes determines that no other node is sending data, and thus sends data. However, the CSMA/CA method has a problem of collision that occurs between a signal sent from a sending node to a destination node and a signal sent from a node that is in an area directly communicable with the destination node but is impossible to detect the transmission by the sending node. The collision may be called interference. The node in which a power of received signal transmitted from the sending node is less than a threshold value may be called a "hidden node".

The wireless multi-hop network includes a tree-type network and a mesh-type network. The tree-type network includes a plurality of terminals and a gateway (GW) that is an information gathering station bundling the terminals. Existence of terminals at a high density under one gateway can produce traffic that is not accommodated by one gateway. In this case, additional installation of a new other gateway can increase the amount of traffic accommodated as a system, that is, the traffic capacity of the system.

However, when the newly added gateway is installed in an area from which an electromagnetic wave reaches the existing gateway, both of the gateways become competitors trying to acquire a wireless resource according to the CSMA/CA method. Specifically, while one of the gateways performs communication, the other gateway waits, and, as a result, is impossible to receive data directed to the other gateway itself, until the communication is terminated. Therefore, in such a case, adding the new gateway does not result in increasing the traffic capacity of the overall system.

There are conventionally methods to control transmission power of a plurality of terminals in the mesh-type network so as to suppress the interference between signals sent from the terminals. Conventional examples are described in Japanese Laid-open Patent Publication No. 2011-146850 and Japanese Laid-open Patent Publication No. 2011-254191.

However, simple application of the conventional interference suppression methods to the tree-type network causes a gateway to give a higher priority to quality of communication with a terminal directly communicating with the gateway itself than to suppression of the interference to other gateways through reduction in the transmission power. Therefore, the gateway giving interference to the other gateways reduces the transmission power thereof only to an extent that does not degrade the quality of communication with the terminal directly communicating with the gateway itself. As a result, the interference between signals sent from the gateways is not suppressed.

When the gateway simply reduces the transmission power to suppress the interference between the signals sent from the gateways, the communication with the terminal directly communicating with the gateway can be disconnected.

SUMMARY

According to an aspect of an embodiment, a multi-hop communication terminal that communicates with a gateway to which the multi-hop communication terminal belongs via a communication route that is an indirect route including at least one other terminal or a direct route. The multi-hop communication terminal includes a receiving unit and a routing control unit. The receiving unit receives:

a first broadcast signal that is sent at a first transmission power value from the gateway to which the multi-hop communication terminal belongs and that includes information on a first planned transmission power value of a data signal in the gateway to which the multi-hop communication terminal belongs, the first planned transmission power value being smaller than the first transmission power value; and a hello signal that includes type information and identification information of a node other than the terminal, and information on a second planned transmission power value of a data signal in the other node. The routing control unit determines the communication route based on the received first broadcast signal and the received hello signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings.

Note that the embodiments do not limit the multi-hop communication terminal, the multi-hop communication system, and the multi-hop communication method disclosed by the present application. Note also that, in the embodiments, the same numerals will be given to configurations having the same functions, and duplicate descriptions thereof will be omitted.

[a] First Embodiment

Overview of Multi-Hop Communication System

Figure 1:
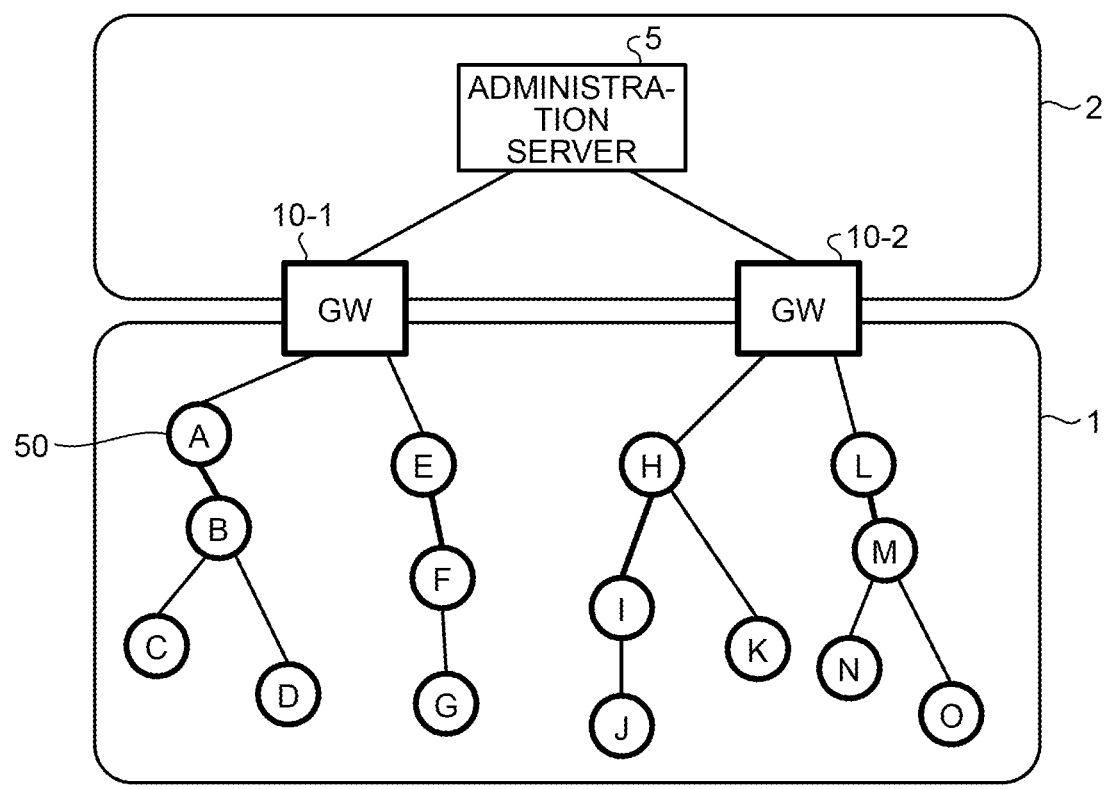
FIG. 1 is a diagram illustrating an example of a multi-hop communication system of a first embodiment of the present invention.

FIG. 1 is a diagram illustrating an example of the multi-hop communication system of a first embodiment of the present invention. FIG. 1 illustrates a wireless multi-hop network 1 and a wired network 2. The wireless multi-hop network 1 includes a plurality of nodes. The nodes include a plurality of gateways (GWs) 10 and a plurality of multi-hop communication terminals 50. The wireless multi-hop network 1 and the wired network 2 are connected via the GWs 10. The multi-hop communication system may be hereinafter simply called the communications system. The multi-hop communication terminals may also be simply called the terminals.

The wired network 2 is an internet protocol (IP) network that performs data communication based on the IP, etc., and includes an administration server 5 connected to the GWs 10. The administration server 5 is a server device that collects data detected in the wireless multi-hop network 1 and performs power supply management, abnormality detection, etc. of the nodes in the wireless multi-hop network 1.

In FIG. 1, the wireless multi-hop network 1 includes nodes A to G as the terminals 50 under a GW 10-1. The wireless multi-hop network 1 also includes nodes H to O as the terminals 50 under a GW 10-2. Each of the nodes in the wireless multi-hop network 1 selects one node from other nodes existing in a range (may be called a "reachable area" hereinafter) within reach of a data signal sent from each of the nodes itself, and performs communication via a communication route including the selected node. For example, in FIG. 1, the node C communicates with the GW 10-1 via a communication route including the nodes B and A.

When a GW 10 out of the GWs 10 detects a signal sent from a node other than the terminals 50 (also called "first hop terminals" hereinafter) directly communicating with the GW, the GW sends an "interference broadcast signal". This interference broadcast signal is broadcast at a "first transmission power value". The first transmission power value is a transmission power value known to all of the nodes, and, for example, a maximum transmission power value of the GWs 10. The interference broadcast signal includes a "first planned transmission power value" of a data signal to be sent after the interference broadcast signal is sent. The first planned transmission power value is a transmission power value at which the transmission data signal does not reach the node from which the interference is received. In other words, when a GW 10 out of the GWs 10 detects interference from a node other than the first hop terminals, the GW 10 adjusts its own reachable area so as not to include the interfering node.

When having received the interference broadcast signal from another GW 10, the GW 10 changes a set transmission power value that is set for a data signal from a currently set power value to a transmission power value at which the transmission data signal does not reach the other GW 10. In other words, the GW 10 adjusts its own reachable area so as not to include the other GW 10 that may be subjected to the interference from the GW 10.

In this manner, the GW 10 can suppress the interference between the GWs 10 by adjusting its own reachable area using as a trigger the event that the GW detects the interference received by itself, or the GW receives the interference broadcast signal sent from another GW 10.

The terminal 50 that is currently the first hop terminal may come out of the reachable area of the GW 10 to which the terminal 50 belongs as a result of the adjustment of the reachable area by the GW 10. The terminal 50 coming out of the reachable area of the GW 10 to which the terminal 50 belongs as described above resets the communication route and adjusts the transmission power value. This can allow the terminal 50 coming out of the reachable area of the GW 10 to which the terminal 50 belongs to maintain the communication with the GW 10 to which the terminal 50 belongs via another node. The terminal 50 can determine whether the terminal 50 comes out of the reachable area of the GW 10 to which the terminal 50 belongs by comparing the first planned transmission power value included in the interference broadcast signal sent from the GW 10 to which the terminal 50 belongs with a path loss value between the terminal 50 and the GW 10 to which the terminal 50 belongs. The path loss value can be calculated based on the interference broadcast signal or a hello signal sent from each of the nodes at a "second transmission power value". The second transmission power value is a transmission power value known to all of the nodes, and, for example, the maximum transmission power value. The hello signal includes a "second planned transmission power value" of a data signal to be sent from the transmission source node after the hello signal is sent.

When the terminal 50 is still included in the reachable area after adjustment after the reachable area is adjusted by the GW 10 to which the terminal 50 belongs, the terminal 50 sends the data signal at the first planned transmission power value included in the interference broadcast signal sent from the GW 10 to which the terminal 50 belongs. However, when the terminal 50 has received both the interference broadcast signal from the GW 10 to which the terminal 50 belongs and the interference broadcast signal sent from a GW 10 other than the GW 10 to which the terminal 50 belongs, the terminal 50 sends the data signal at a transmission power value at which the transmission data signal reaches the GW 10 to which the terminal 50 belongs but does not reach the other GW 10. The terminal 50 that has received both the interference broadcast signal from the GW 10 to which the terminal 50 belongs and the interference broadcast signal sent from a GW 10 other than the GW 10 to which the terminal 50 belongs refers to a terminal included in the reachable area of both of the GW 10 to which the terminal 50 belongs and the other GW 10.

When the terminal 50 has not received the interference broadcast signal from either the GW 10 to which the terminal 50 belongs or any other GW 10, the terminal 50 resets the communication route and sets the transmission power value when a certain condition is satisfied. The terminal 50 that has not received the interference broadcast signal from either the GW 10 to which the terminal 50 belongs or any other GW 10 refers to a terminal that is included in neither of the reachable areas.

As described above, the GW 10 sends the above-described interference broadcast signal when the interference is detected, and the terminal 50 resets the communication route and sets the transmission power value based on the interference broadcast signal of the GW 10 to which the terminal 50 belongs, the interference broadcast signal of the other GW 10, and the hello signal of a node other than the terminal 50. This can prevent the interference between the gateways, and can allow the terminal directly communicating with the gateway to maintain the communication.

Configuration of Gateway

Figure 2:
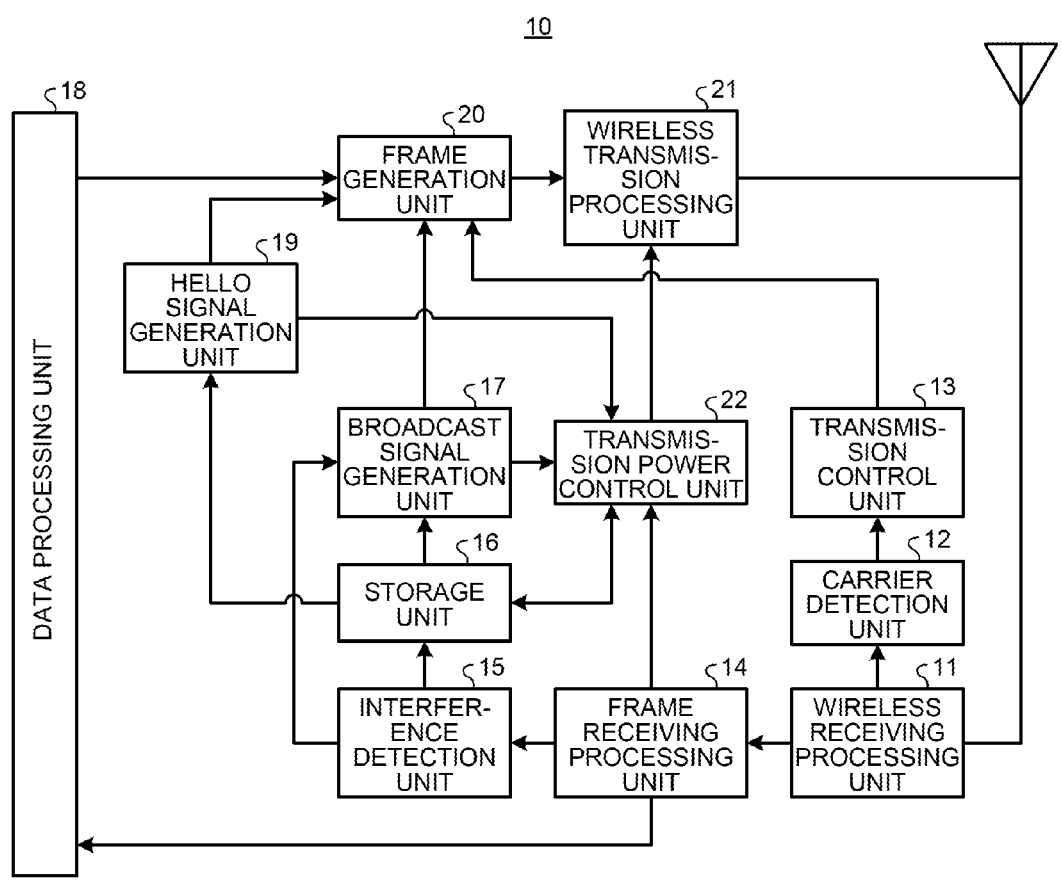
FIG. 2 is a block diagram illustrating an example of a gateway of the first embodiment.

FIG. 2 is a block diagram illustrating an example of the gateway of the first embodiment. In FIG. 2, the GW 10 includes a wireless receiving processing unit 11, a carrier detection unit 12, a transmission control unit 13, a frame receiving processing unit 14, an interference detection unit 15, and a storage unit 16. The GW 10 further includes a broadcast signal generation unit 17, a data processing unit 18, a hello signal generation unit 19, a frame generation unit 20, a wireless transmission processing unit 21, and a transmission power control unit 22. The GW 10 also includes an interface (not illustrated) connected to the wired network.

The wireless receiving processing unit 11 outputs a wireless signal received via an antenna to the carrier detection unit 12. The wireless receiving processing unit 11 also applies wireless receiving processing, such as down-conversion and analog-digital (AD) conversion, to the wireless signal received via the antenna, and outputs the received signal after the wireless receiving processing to the frame receiving processing unit 14.

Based on the power of the signal received from the wireless receiving processing unit 11, the carrier detection unit 12 determines whether other nodes are sending signals, and outputs the determination result to the transmission control unit 13.

Based on the determination result received from the carrier detection unit 12, the transmission control unit 13 controls transmission timing of a signal to be sent from the GW 10. For example, the transmission control unit 13 outputs a transmission command signal to the frame generation unit 20 at the time when other nodes are not sending signals. The frame generation unit 20 sends the signal according to the transmission command signal. Thus, the GW 10 sends the transmission signal in a period when other nodes are not sending signals.

The frame receiving processing unit 14 switches the output destinations depending on the type of the signal received from the wireless receiving processing unit 11. For example, the frame receiving processing unit 14 outputs a data signal directed to the GW 10 to the data processing unit 18. The frame receiving processing unit 14 outputs a data signal directed not to the GW 10 but to another node to the interference detection unit 15. The frame receiving processing unit 14 outputs, to the transmission power control unit 22, the interference broadcast signal sent from another GW 10 and the hello signal sent from a node other than the GW 10.

Based on the data signal received from the frame receiving processing unit 14, the interference detection unit 15 detects interference from a node other than the first hop terminals of the GW 10, and identifies identification information of the interfering node (that is, the interfering source address). The identified interfering source address is stored into the storage unit 16. The storage unit 16 stores therein a table (not illustrated) that holds identification information of the first hop terminals of the GW 10. Comparing the identification information held in this table with the identification information of the interfering node enables determination of whether the interfering node is a node in the first hop terminals of the GW 10. In addition, inclusion of a node type in the identification information of the node enables determination of whether the interfering node is another GW 10 or one of the terminals 50. The interference detection unit 15 may determine that it has detected interference when a data signal sent from one interfering node is detected at a certain time. The interference detection unit 15 may alternatively determine that it has detected interference when data signals sent from one interfering node are continuously detected during a certain period starting from a first time point. In this case, the certain period is measured by a timer (not illustrated).

When having detected the interference from the node other than the first hop terminals of the GW 10, the interference detection unit 15 outputs a detection notification signal to the broadcast signal generation unit 17.

After receiving the detection notification signal from the interference detection unit 15, the broadcast signal generation unit 17 generates an interference broadcast signal. As described above, this interference broadcast signal includes the "first planned transmission power value" of a data signal to be sent after the interference broadcast signal is sent. The first planned transmission power value is a transmission power value at which the data signal does not reach the detected interfering node. The first planned transmission power value has been calculated by the transmission power control unit 22 and stored in the storage unit 16.

Then, the broadcast signal generation unit 17 outputs the generated interference broadcast signal to the frame generation unit 20, and outputs a generation completion notification to the transmission power control unit 22. After receiving the generation completion notification, the transmission power control unit 22 sets the transmission power value to be set for the wireless transmission processing unit 21 to the maximum transmission power value. This causes the interference broadcast signal to be sent at the maximum transmission power. Although the interference broadcast signal has been described here as being sent at the maximum transmission power value, the transmission power value may be a transmission power value known to all of the nodes other than the maximum transmission power value, as described above.

The data processing unit 18 applies certain processing, such as decoding, to the data signal received from the frame receiving processing unit 14. The data processing unit 18 also generates user data, and outputs it to the frame generation unit 20.

The hello signal generation unit 19 generates a hello signal. The hello signal includes the "second planned transmission power value" of a data signal to be sent from the GW 10 after the hello signal is sent. The second planned transmission power value has been calculated by the transmission power control unit 22 and stored in the storage unit 16.

Then, the hello signal generation unit 19 outputs the generated hello signal to the frame generation unit 20, and outputs a generation completion notification to the transmission power control unit 22. After receiving the generation completion notification, the transmission power control unit 22 sets the transmission power value to be set for the wireless transmission processing unit 21 to the maximum transmission power value. This causes also the hello signal to be sent at the maximum transmission power value. Although the hello signal has been described here as being sent at the maximum transmission power value, the transmission power value may be a transmission power value known to all of the nodes other than the maximum transmission power value, as described above.

The frame generation unit 20 generates a frame signal by mapping, to a wireless frame, the data signal, the interference broadcast signal, and the hello signal that have been received, and outputs the generated frame signal to the wireless transmission processing unit 21 at the time in accordance with the transmission command signal. When interference by any interfering node has caused the interference broadcast signal to be sent a number of times exceeding a certain threshold value, that is, when interference by any interfering node has been detected a number of times exceeding the certain value, the frame generation unit 20 may exclude, from signals to be retransmitted, the interference broadcast signal indicating the interference by the interfering node.

The wireless transmission processing unit 21 applies certain wireless transmission processing, such as digital-analog (DA) conversion, up-conversion, and amplification, to the frame signal received from the frame generation unit 20, and sends the obtained wireless signal via the antenna. Here, the wireless signal is sent after being amplified to the transmission power value set by the transmission power control unit 22.

The transmission power control unit 22 determines the transmission power value of the data signal in the GW 10 based on the interference broadcast signal sent from another GW 10, or based on the hello signal sent from another GW 10.

When the interference detection unit 15 has detected interference from other nodes, the transmission power control unit 22 calculates the transmission power value of the data signal in the GW 10 based on the hello signals sent from the interfering nodes.

Here, the transmission power control unit 22 assumes, as the lower limit value of the transmission power value of the data signal in the GW 10, the minimum value among required transmission power values each of which is calculated from a path loss value calculated based on a hello signal and from required receiving sensitivity for each of the terminals 50 serving as transmission source nodes of the hello signals.

Figure 3:
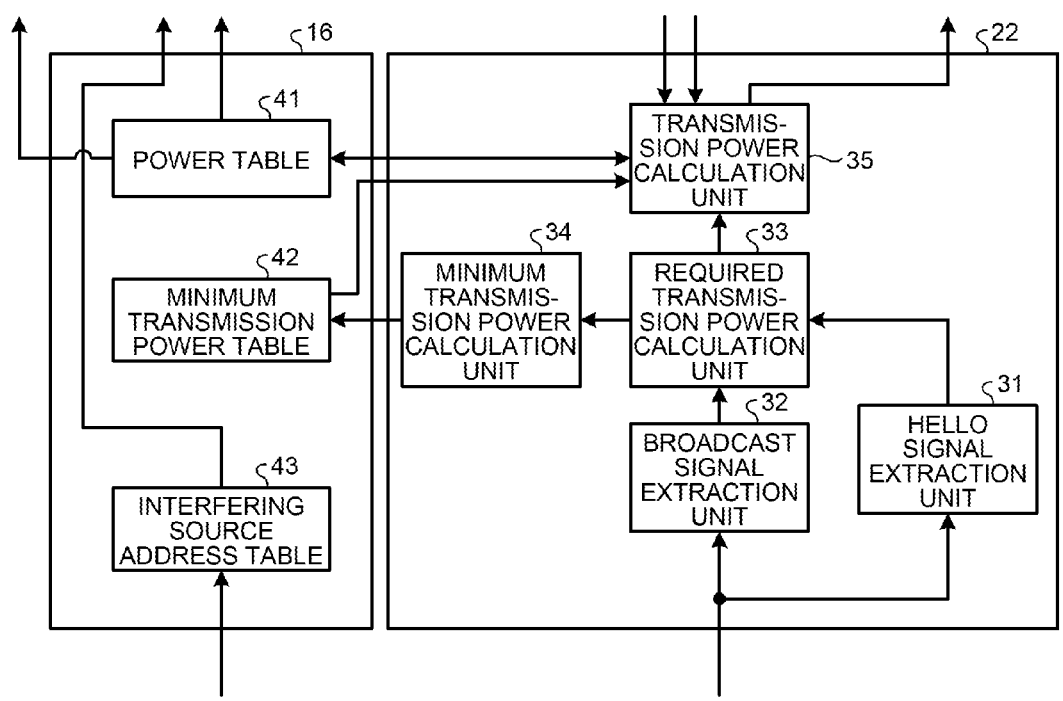
FIG. 3 is a block diagram illustrating an example of a transmission power control unit and a storage unit in the gateway.

For example, as illustrated in FIG. 3, the transmission power control unit 22 includes a hello signal extraction unit 31, a broadcast signal extraction unit 32, a required transmission power calculation unit 33, a minimum transmission power calculation unit 34, and a transmission power calculation unit 35. FIG. 3 is a block diagram illustrating an example of the transmission power control unit and the storage unit in the gateway.

The hello signal extraction unit 31 extracts the hello signal from the signals received from the frame receiving processing unit 14, and identifies the identification information of the transmission source node of the extracted hello signal. Then, the hello signal extraction unit 31 outputs the extracted hello signal and the identified identification information of the transmission source node as a set to the required transmission power calculation unit 33.

The broadcast signal extraction unit 32 extracts the interference broadcast signal from the signals received from the frame receiving processing unit 14, and identifies the identification information of another GW 10 that is the transmission source of the extracted interference broadcast signal. Then, the broadcast signal extraction unit 32 outputs the extracted interference broadcast signal and the identified identification information of the other GW 10 as a set to the required transmission power calculation unit 33.

The required transmission power calculation unit 33 calculates the path loss value between the GW 10 and the transmission source node of the hello signal based on the receiving power value of the hello signal received from the hello signal extraction unit 31. For example, the path loss value can be calculated by subtracting the receiving power value from the transmission power value of the hello signal, which is already known.

The required transmission power calculation unit 33 also calculates the path loss value between the GW 10 and the other GW 10 serving as the transmission source of the interference broadcast signal based on the receiving power value of the interference broadcast signal received from the broadcast signal extraction unit 32. For example, the path loss value can be calculated by subtracting the receiving power value from the transmission power value of the interference broadcast signal, which is already known.

Then, based on the calculated path loss value and the required receiving sensitivity, the required transmission power calculation unit 33 calculates the required transmission power value.

Then, the required transmission power calculation unit 33 outputs, to the transmission power calculation unit 35 and the minimum transmission power calculation unit 34, the calculated required transmission power value and the identification information of the transmission source node corresponding to the required transmission power value, in a manner associated with each other.

The minimum transmission power calculation unit 34 identifies the minimum value among the required transmission power values for the terminals 50 received from the required transmission power calculation unit 33, and outputs the identified minimum value and the identification information of the terminal 50 corresponding thereto to the storage unit 16. This causes the storage unit 16 to store therein the identified minimum value and the identification information of the terminal 50 corresponding thereto. The GW 10 can now directly communicate with at least one of the terminals 50 by setting the transmission power value to this minimum value or more.

Based on the required transmission power value calculated by the required transmission power calculation unit 33, the transmission power calculation unit 35 calculates the transmission power value of the data signal in the GW 10, and outputs the calculated transmission power value in the storage unit 16. This causes the storage unit 16 to store therein the calculated transmission power value. When the transmission power calculation unit 35 has received the generation completion notification from the broadcast signal generation unit 17 or the hello signal generation unit 19, the transmission power calculation unit 35 reads the maximum transmission power value stored in the storage unit 16, and sets the maximum transmission power value for the wireless transmission processing unit 21. At the time of data transmission, the transmission power calculation unit 35 sets the calculated transmission power value of the data signal for the wireless transmission processing unit 21.

Referring back to FIG. 2, the storage unit 16 stores therein the maximum transmission power value and the transmission power value that is calculated by the transmission power calculation unit 35. The storage unit 16 also stores therein the minimum value calculated by the minimum transmission power calculation unit 34. The storage unit 16 also stores therein the interfering source address identified by the interference detection unit 15.

For example, as illustrated in FIG. 3, the storage unit 16 includes a power table 41, a minimum transmission power table 42, and an interfering source address table 43. The power table 41 holds the maximum transmission power value and the transmission power value that is calculated by the transmission power calculation unit 35. The minimum transmission power table 42 holds the minimum value calculated by the minimum transmission power calculation unit 34. The interfering source address table 43 holds the interfering source address identified by the interference detection unit 15.

Configuration of Terminal

Figure 4:
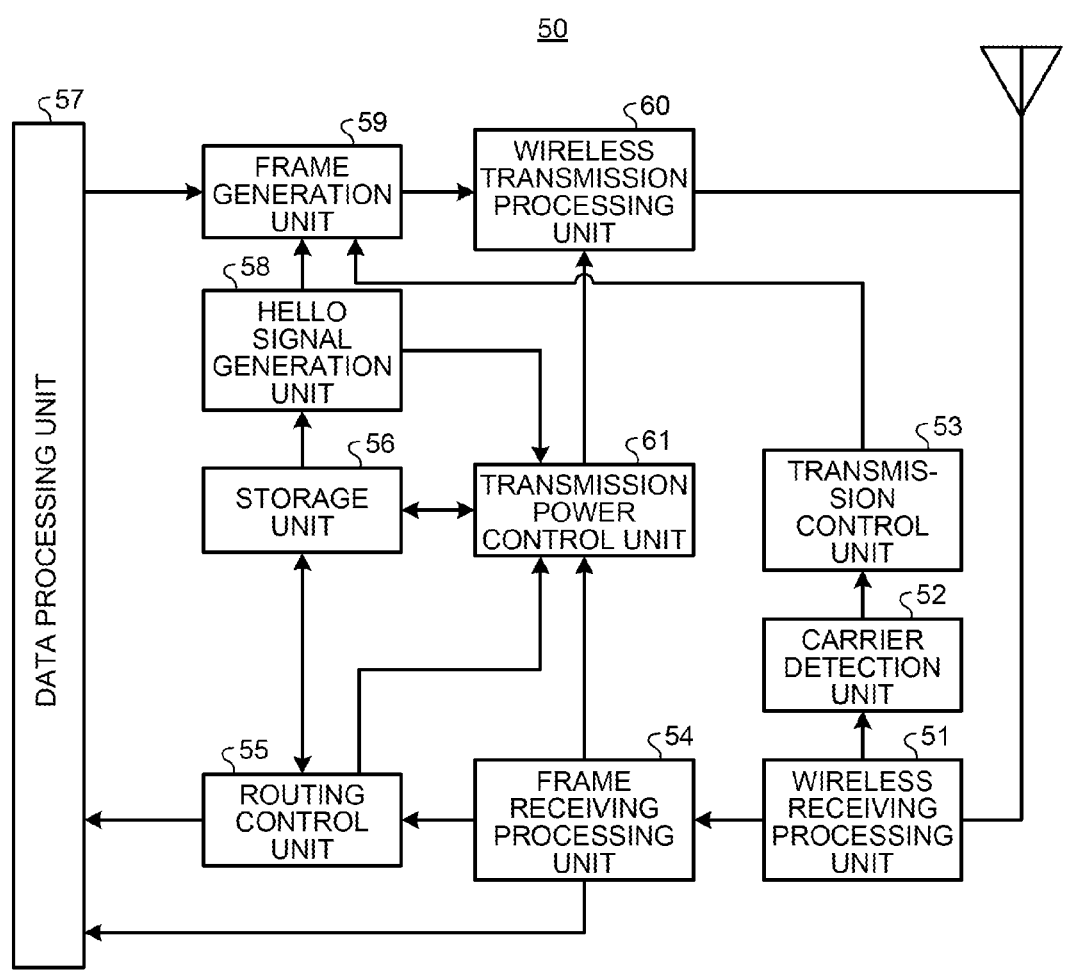
FIG. 4 is a block diagram illustrating an example of a multi-hop communication terminal of the first embodiment.

FIG. 4 is a block diagram illustrating an example of the multi-hop communication terminal of the first embodiment. In FIG. 4, the terminal 50 includes a wireless receiving processing unit 51, a carrier detection unit 52, a transmission control unit 53, a frame receiving processing unit 54, a routing control unit 55, and a storage unit 56. The terminal 50 further includes a data processing unit 57, a hello signal generation unit 58, a frame generation unit 59, a wireless transmission processing unit 60, and a transmission power control unit 61.

The wireless receiving processing unit 51 outputs a wireless signal received via an antenna to the carrier detection unit 52. The wireless receiving processing unit 51 also applies wireless receiving processing, such as down-conversion and analog-digital (AD) conversion, to the wireless signal received via the antenna, and outputs the received signal after the wireless receiving processing to the frame receiving processing unit 54.

Based on the power of the signal received from the wireless receiving processing unit 51, the carrier detection unit 52 determines whether other nodes are sending signals, and outputs the determination result to the transmission control unit 53.

Based on the determination result received from the carrier detection unit 52, the transmission control unit 53 controls transmission timing of a signal to be sent from the terminal 50. For example, the transmission control unit 53 outputs a transmission command signal to the frame generation unit 59 at the time when other nodes are not sending signals. The frame generation unit 59 sends the signal according to the transmission command signal. Thus, the terminal 50 sends the transmission signal in a period when other nodes are not sending signals.

The frame receiving processing unit 54 switches the output destinations depending on the type of the signal received from the wireless receiving processing unit 51. For example, the frame receiving processing unit 54 outputs a data signal directed to the terminal 50 to the data processing unit 57. The frame receiving processing unit 54 outputs, to the routing control unit 55 and the transmission power control unit 61, the interference broadcast signal sent from the GWs 10 and the hello signal sent from a node other than the terminal 50.

The routing control unit 55 sets the communication route based on an interference broadcast signal from any GW 10 other than the GW 10 to which the terminal 50 belongs and whether the interference broadcast signal is received, an interference broadcast signal from the GW 10 to which the terminal 50 belongs and whether the interference broadcast signal is received, and the hello signal sent from a node other than the terminal 50.

For example, when an interference broadcast signal is received from the GW 10 to which the terminal 50 belongs, and no interference broadcast signal is received from any other GW 10, the routing control unit 55 determines whether the terminal 50 is outside the reachable area of the GW 10 to which the terminal 50 belongs. In this determination, when the routing control unit 55 determines that the first planned transmission power value included in the interference broadcast signal from the GW 10 to which the terminal 50 belongs is smaller than the required transmission power value between the terminal 50 and the GW 10 to which the terminal 50 belongs, the terminal 50 is determined as outside the reachable area of the GW 10 to which the terminal 50 belongs. When the terminal 50 is determined as outside the reachable area of the GW 10 to which the terminal 50 belongs, the routing control unit 55 resets the communication route. At this time, the routing control unit 55 determines, as the communication route, one alternative from a plurality of communication route alternatives including the other terminals 50 existing in the reachable area of the terminal 50 determined by the first planned transmission power value included in the interference broadcast signal from the GW 10 to which the terminal 50 belongs. The criterion for selecting one alternative from the communication route alternatives is a route cost that is calculated for each of the communication route alternatives. When the routing control unit 55 determines that the terminal 50 is not outside the reachable area of the GW 10 to which the terminal 50 belongs, the routing control unit 55 maintains the current communication route, that is, the direct route that directly connects the terminal 50 to the GW 10 to which the terminal 50 belongs.

When both an interference broadcast signal from the GW 10 to which the terminal 50 belongs and an interference broadcast signal from another GW 10 are received, the routing control unit 55 basically maintains the current communication route, that is, the direct route that is directly connected to the GW 10 to which the terminal 50 belongs.

When neither an interference broadcast signal from the GW 10 to which the terminal 50 belongs nor an interference broadcast signal from any other GW 10 is received, the routing control unit 55 resets the communication route when a certain condition is satisfied. The certain condition means that the second planned transmission power value included in the hello signal sent from the first hop terminal for the terminal 50, that is, the adjacent terminal 50 on the currently set communication route is smaller than the transmission power value that is currently set for sending the data signal of the terminal 50. At this time, the routing control unit 55 determines, as the communication route, one alternative from a plurality of communication route alternatives including the other terminals 50 existing in the reachable area of the terminal 50 determined by the second planned transmission power value included in the hello signal from the first hop terminal for the terminal 50. The criterion for selecting one alternative from the communication route alternatives is the route cost that is calculated for each of the communication route alternatives.

Figure 5:
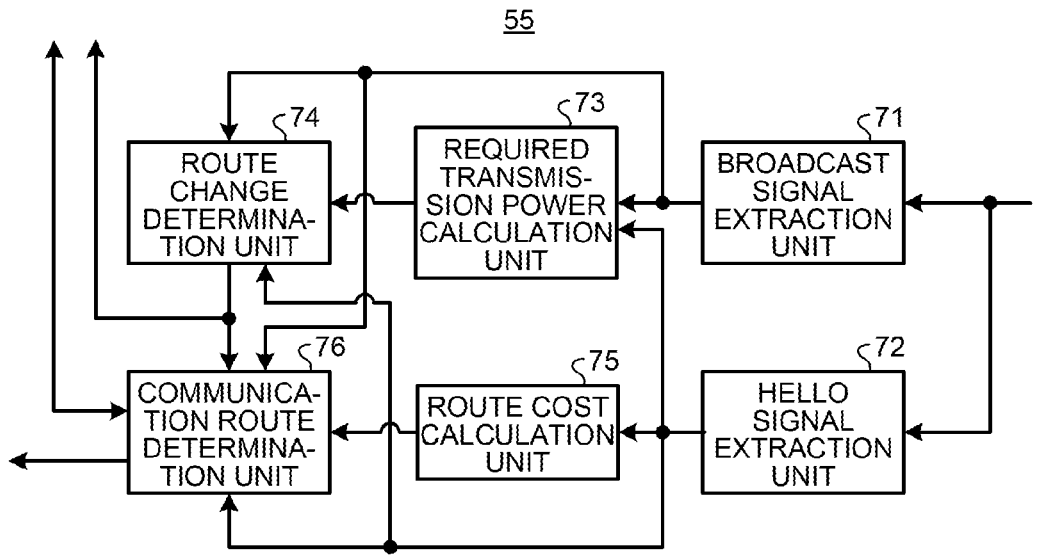
FIG. 5 is a block diagram illustrating an example of a routing control unit in the terminal.

In detail, as illustrated in FIG. 5, the routing control unit 55 includes a broadcast signal extraction unit 71, a hello signal extraction unit 72, a required transmission power calculation unit 73, a route change determination unit 74, a route cost calculation unit 75, and a communication route determination unit 76. FIG. 5 is a block diagram illustrating an example of the routing control unit in the terminal.

The broadcast signal extraction unit 71 extracts the interference broadcast signal from the signals received from the frame receiving processing unit 54, and identifies the identification information of the GW 10 that is the transmission source of the extracted interference broadcast signal. Then, the broadcast signal extraction unit 71 outputs the extracted interference broadcast signal and the identified identification information of the GW 10 as a set to the required transmission power calculation unit 73, the route change determination unit 74, and the communication route determination unit 76.

The hello signal extraction unit 72 extracts the hello signal from the signals received from the frame receiving processing unit 54, and identifies the identification information of the transmission source node of the extracted hello signal. Then, the hello signal extraction unit 72 outputs the extracted hello signal and the identified identification information of the transmission source node as a set to the required transmission power calculation unit 73, the route change determination unit 74, the route cost calculation unit 75, and the communication route determination unit 76.

The required transmission power calculation unit 73 calculates the path loss value between the terminal 50 and the GW 10 serving as the transmission source of the interference broadcast signal based on the receiving power value of the interference broadcast signal received from the broadcast signal extraction unit 71. For example, the path loss value can be calculated by subtracting the receiving power value from the transmission power value of the interference broadcast signal, which is already known.

The required transmission power calculation unit 73 also calculates the path loss value between the terminal 50 and the transmission source node of the hello signal based on the receiving power value of the hello signal received from the hello signal extraction unit 72. For example, the path loss value can be calculated by subtracting the receiving power value from the transmission power value of the hello signal, which is already known.

Then, based on the calculated path loss value and the required receiving sensitivity, the required transmission power calculation unit 73 calculates the required transmission power value.

Then, the required transmission power calculation unit 73 outputs, to the route change determination unit 74, the calculated required transmission power value and the identification information of the transmission source node corresponding to the required transmission power value, in a manner associated with each other.

When either of the following conditions is satisfied, the route change determination unit 74 determines to change the route.

Condition 1: An interference broadcast signal is received from the GW 10 to which the terminal 50 belongs whereas no interference broadcast signal is received from any other GW 10, and the terminal 50 is determined as outside the reachable area of the GW 10 to which the terminal 50 belongs.

Condition 2: Neither an interference broadcast signal from the GW 10 to which the terminal 50 belongs nor an interference broadcast signal from any other GW 10 is received, and the second planned transmission power value included in the hello signal from the first hop terminal for the terminal 50 is smaller than the transmission power value that is currently set for the data signal of the terminal 50.

Then, the route change determination unit 74 outputs the determination result of whether to change the route to the communication route determination unit 76 and the transmission power control unit 61.

Based on a plurality of hello signals received from the hello signal extraction unit 72, the route cost calculation unit 75 calculates the route cost of each of the communication route alternatives that include the transmission source nodes of the hello signals as respective adjacent terminals. Here, the route cost refers to, for example, the number of hops on the communication route from the terminal 50 to the GW 10 to which the terminal 50 belongs, that is, the number of terminals 50 existing between the terminal 50 and the GW 10 to which the terminal 50 belongs on the communication route.

Then, the route cost calculation unit 75 outputs the route costs of the respective communication route alternatives and the identification information of the adjacent terminals on the corresponding communication route alternatives as a set to the communication route determination unit 76.

When Condition 1 above is satisfied, the communication route determination unit 76 identifies a plurality of communication route alternatives that include, as the adjacent terminals, the terminals 50 existing in the reachable area of the terminal 50 determined by the first planned transmission power value included in the interference broadcast signal from the GW 10 to which the terminal 50 belongs. Then, the communication route determination unit 76 determines, as the communication route, the communication route alternative having the smallest route cost among the identified communication route alternatives.

When Condition 2 above is satisfied, the communication route determination unit 76 identifies a plurality of communication route alternatives that include, as the adjacent terminals, the terminals 50 existing in the reachable area of the terminal 50 determined by the second planned transmission power value included in the hello signal sent from the adjacent terminal on the current communication route. Then, the communication route determination unit 76 determines, as the communication route, the communication route alternative having the smallest route cost among the identified communication route alternatives.

In other cases, the communication route determination unit 76 determines to maintain the currently set communication route. The identification information of the GW 10 to which the terminal 50 belongs is read from the storage unit 56.

Then, the communication route determination unit 76 outputs information on the determined communication route to the data processing unit 57.

Referring back to FIG. 4, the data processing unit 57 applies certain processing, such as decoding, to the data signal received from the frame receiving processing unit 54. The data processing unit 57 also generates user data, and outputs it to the frame generation unit 59.

The hello signal generation unit 58 generates a hello signal. The hello signal includes the "second planned transmission power value" of a data signal to be sent from the terminal 50 after the hello signal is sent. The second planned transmission power value has been calculated by the transmission power control unit 61 and stored in the storage unit 56.

Then, the hello signal generation unit 58 outputs the generated hello signal to the frame generation unit 59, and outputs a generation completion notification to the transmission power control unit 61. After receiving the generation completion notification, the transmission power control unit 61 sets the transmission power value to be set for the wireless transmission processing unit 60 to the maximum transmission power value. This causes the hello signal to be sent at the maximum transmission power value. Although the hello signal has been described here as being sent at the maximum transmission power value, the transmission power value may be a transmission power value known to all of the nodes other than the maximum transmission power value, as described above.

The frame generation unit 59 generates a frame signal by mapping, to a wireless frame, the data signal and the hello signal that have been received, and outputs the generated frame signal to the wireless transmission processing unit 60 at the time in accordance with the transmission command signal.

The wireless transmission processing unit 60 applies certain wireless transmission processing, such as digital-analog (DA) conversion, up-conversion, and amplification, to the frame signal received from the frame generation unit 59, and sends the obtained wireless signal via the antenna. Here, the wireless signal is sent after being amplified to the transmission power value set by the transmission power control unit 61.

The transmission power control unit 61 sets the transmission power value of the data signal based on an interference broadcast signal from any GW 10 other than the GW 10 to which the terminal 50 belongs and whether the interference broadcast signal is received, an interference broadcast signal from the GW 10 to which the terminal 50 belongs and whether the interference broadcast signal is received, and the hello signal sent from a node other than the terminal 50.

For example, when an interference broadcast signal is received from the GW 10 to which the terminal 50 belongs, and no interference broadcast signal is received from any other GW 10, the transmission power control unit 61 determines the first planned transmission power value included in the interference broadcast signal from the GW 10 to which the terminal 50 belongs as the transmission power value of the transmission data of the terminal 50.

When both an interference broadcast signal from the GW 10 to which the terminal 50 belongs and an interference broadcast signal from another GW 10 are received, the transmission power control unit 61 calculates a transmission power value at which the transmission signal reaches the GW 10 to which the terminal 50 belongs but does not reach the other GW 10.

When neither an interference broadcast signal from the GW 10 to which the terminal 50 belongs nor an interference broadcast signal from any other GW 10 is received, the transmission power control unit 61 sets, as the transmission power value of the terminal 50, the second planned transmission power value included in the hello signal from the adjacent terminal on the communication route reset by the routing control unit 55.

Figure 6:
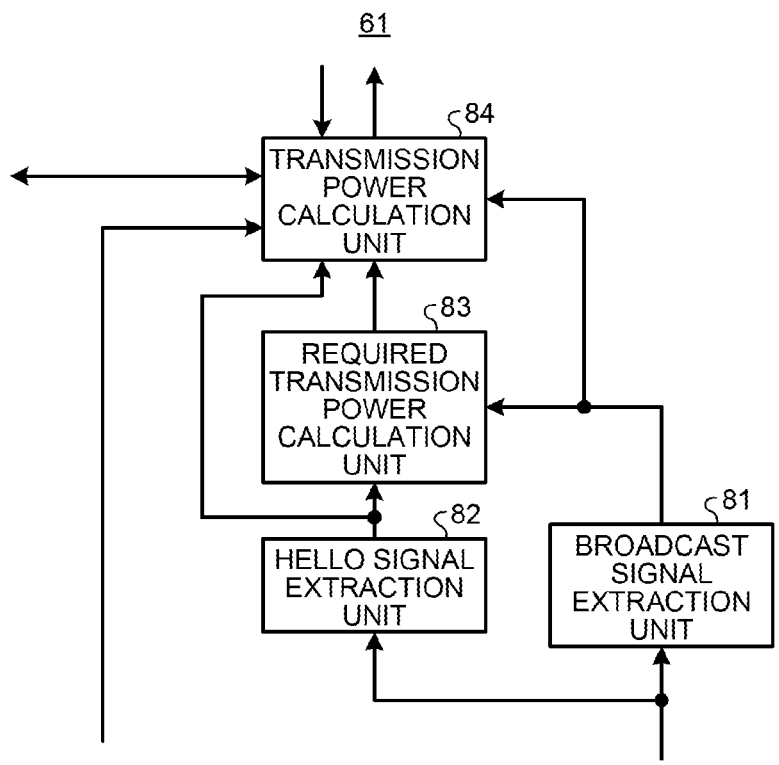
FIG. 6 is a block diagram illustrating an example of a transmission power control unit in the terminal.

In detail, as illustrated in FIG. 6, the transmission power control unit 61 includes a broadcast signal extraction unit 81, a hello signal extraction unit 82, a required transmission power calculation unit 83, and a transmission power calculation unit 84. FIG. 6 is a block diagram illustrating an example of the transmission power control unit in the terminal.

The broadcast signal extraction unit 81 extracts the interference broadcast signal from the signals received from the frame receiving processing unit 54, and identifies the identification information of the GW 10 that is the transmission source of the extracted interference broadcast signal. Then, the broadcast signal extraction unit 81 outputs the extracted interference broadcast signal and the identified identification information of the GW 10 as a set to the required transmission power calculation unit 83 and the transmission power calculation unit 84.

The hello signal extraction unit 82 extracts the hello signal from the signals received from the frame receiving processing unit 54, and identifies the identification information of the transmission source node of the extracted hello signal. Then, the hello signal extraction unit 82 outputs the extracted hello signal and the identified identification information of the transmission source node as a set to the required transmission power calculation unit 83 and the transmission power calculation unit 84.

The required transmission power calculation unit 83 calculates the path loss value between the terminal 50 and the GW 10 serving as the transmission source of the interference broadcast signal based on the receiving power value of the interference broadcast signal received from the broadcast signal extraction unit 81.

The required transmission power calculation unit 83 also calculates the path loss value between the terminal 50 and the transmission source node of the hello signal based on the receiving power value of the hello signal received from the hello signal extraction unit 82.

Based on the calculated path loss value and the required receiving sensitivity, the required transmission power calculation unit 83 calculates the required transmission power value.

Then, the required transmission power calculation unit 83 outputs, to the transmission power calculation unit 84, the calculated required transmission power value and the identification information of the transmission source node corresponding to the required transmission power value, in a manner associated with each other.

When an interference broadcast signal is received from the GW 10 to which the terminal 50 belongs, and no interference broadcast signal is received from any other GW 10, the transmission power calculation unit 84 determines the first planned transmission power value included in the interference broadcast signal from the GW 10 to which the terminal 50 belongs as the transmission power value of the transmission data of the terminal 50.

When both an interference broadcast signal from the GW 10 to which the terminal 50 belongs and an interference broadcast signal from another GW 10 are received, the transmission power calculation unit 84 calculates a transmission power value at which the transmission signal reaches the GW 10 to which the terminal 50 belongs but does not reach the other GW 10. For example, the transmission power calculation unit 84 determines the transmission power value to be larger than the required transmission power value between the terminal 50 and the GW 10 to which the terminal 50 belongs, and smaller than the required transmission power value between the terminal 50 and the other GW 10.

When neither an interference broadcast signal from the GW 10 to which the terminal 50 belongs nor an interference broadcast signal from any other GW 10 is received, the transmission power calculation unit 84 sets, as the transmission power value of the terminal 50, the second planned transmission power value included in the hello signal from the adjacent terminal on the communication route reset by the routing control unit 55.

Referring back to FIG. 4, the storage unit 56 stores therein the maximum transmission power value and the transmission power value that is calculated by the transmission power calculation unit 84. The storage unit 16 also stores therein the identification information of the GW 10 that is the transmission source of the interference broadcast signal. The storage unit 16 also stores therein the identification information of the GW 10 to which the terminal 50 belongs.

Operation of Communication System

A description will be made of operations of a GW and a terminal that have above-described configurations.

Figure 7:
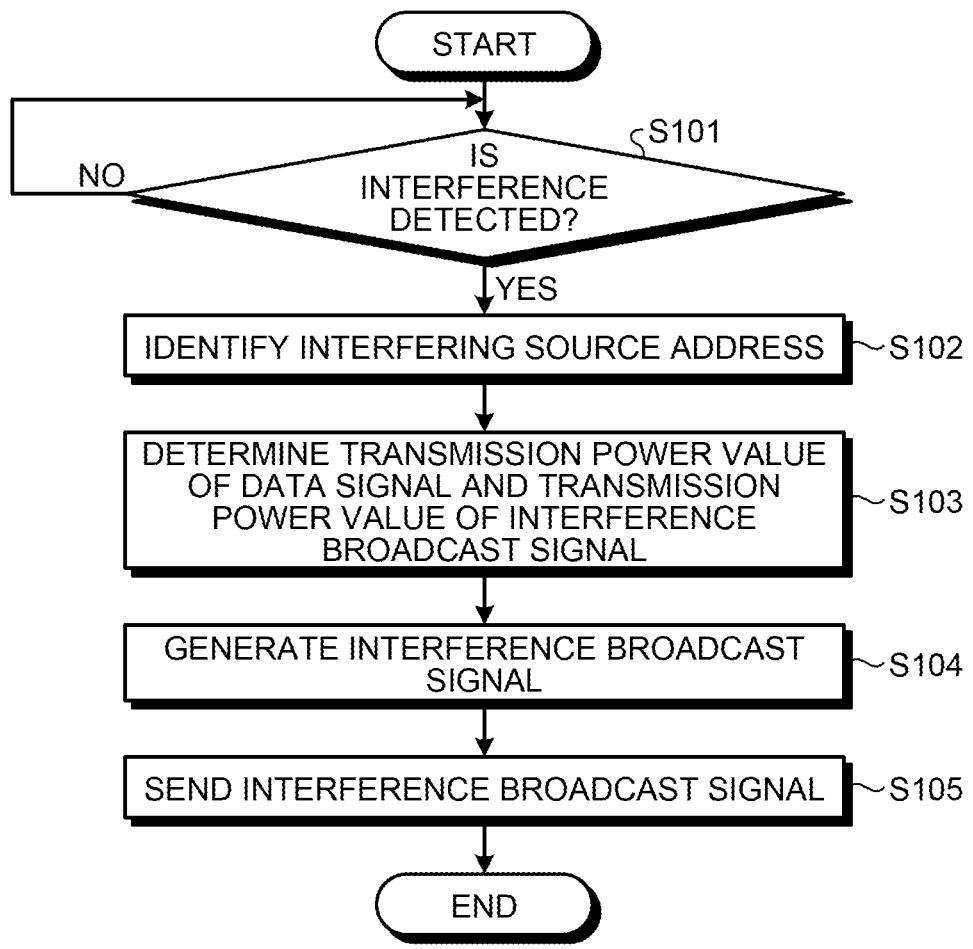
FIG. 7 is a flowchart for explaining a transmission process of an interference broadcast signal and a control process of a power transmission value of a data signal performed by the gateway.

Transmission Process of Interference Broadcast Signal and Control Process of Power Transmission Value of Data Signal Performed by Gateway FIG. 7 is a flowchart for explaining a transmission process of the interference broadcast signal and a control process of the power transmission value of the data signal performed by the gateway.

In the GW 10, the interference detection unit 15 repasts trying to detect interference (No at Step S101), and when interference is detected (Yes at Step S101), the interference detection unit 15 identifies the interfering source address (Step S102).

The transmission power control unit 22 determines the transmission power value of the data signal in the GW 10, and the transmission power value of the interference broadcast signal (Step S103). The transmission power value of the data signal is calculated based on the hello signal sent from the interfering node. The transmission power value of the interference broadcast signal is already stored in the storage unit 16, and is the maximum transmission power value here. For example, the transmission power control unit 22 calculates the path loss value between the GW 10 and the interfering node, and calculates the transmission power value of the data signal based on the calculated path loss value. The calculated new transmission power value is stored into the storage unit 16.

The broadcast signal generation unit 17 generates an interference broadcast signal including the new transmission power value determined by the transmission power control unit 22 (Step S104).

The frame generation unit 20 and the wireless transmission processing unit 21 send the generated interference broadcast signal (Step S105).

When the GW 10 has received an interference broadcast signal from another GW 10, the transmission power control unit 22 determines the transmission power value as follows. That is, the transmission power control unit 22 sets, as a new transmission power value, a larger value between the transmission power value calculated based on the path loss value between the GW 10 and the other GW 10, and the "minimum transmission power value".

Figure 8:
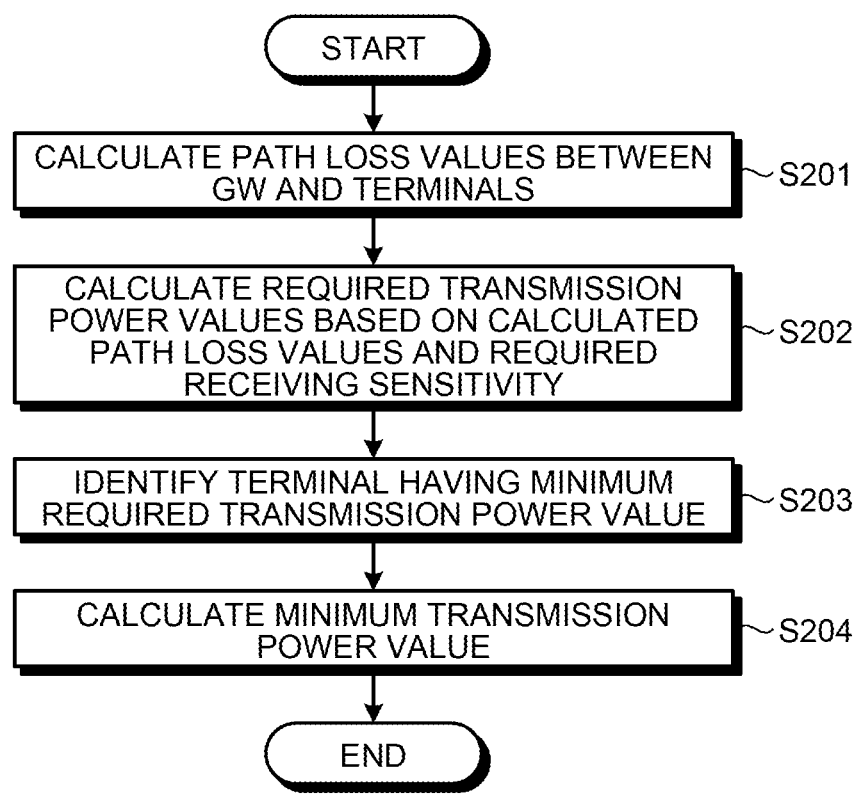
FIG. 8 is a flowchart for explaining a calculation process of a minimum transmission power value.

FIG. 8 is a flowchart for explaining a calculation process of the minimum transmission power value.

The required transmission power calculation unit 33 calculates path loss values between the GW 10 and transmission source terminals of received hello signals (Step S201).

Based on the calculated path loss values and the required receiving sensitivity, the required transmission power calculation unit 33 calculates required transmission power values (Step S202).

The minimum transmission power calculation unit 34 identifies the minimum value among the required transmission power values for the terminals 50 calculated by the required transmission power calculation unit 33, and identifies the terminal 50 corresponding to the identified minimum value (Step S203).

The minimum transmission power calculation unit 34 calculates the minimum transmission power value based on the identified minimum value of the required transmission power values (Step S204).

Although the detection of interference by the interference detection unit 15 is defined to be that a data signal sent from one interfering node is detected at a certain time in the above description, the definition is not limited to this. The detection of interference by the interference detection unit 15 may be defined to be that data signals sent from one interfering node are continuously detected during a certain period starting from a first time point.

The procedure illustrated in FIG. 7 is basically executed each time the interference is detected. However, when interference by any interfering node has caused the interference broadcast signal to be sent a number of times exceeding a certain threshold value, that is, when interference by any interfering node has been detected a number of times exceeding the certain value, the interference broadcast signal indicating the interference by the interfering node may be excluded from signals to be retransmitted.

Figure 9:
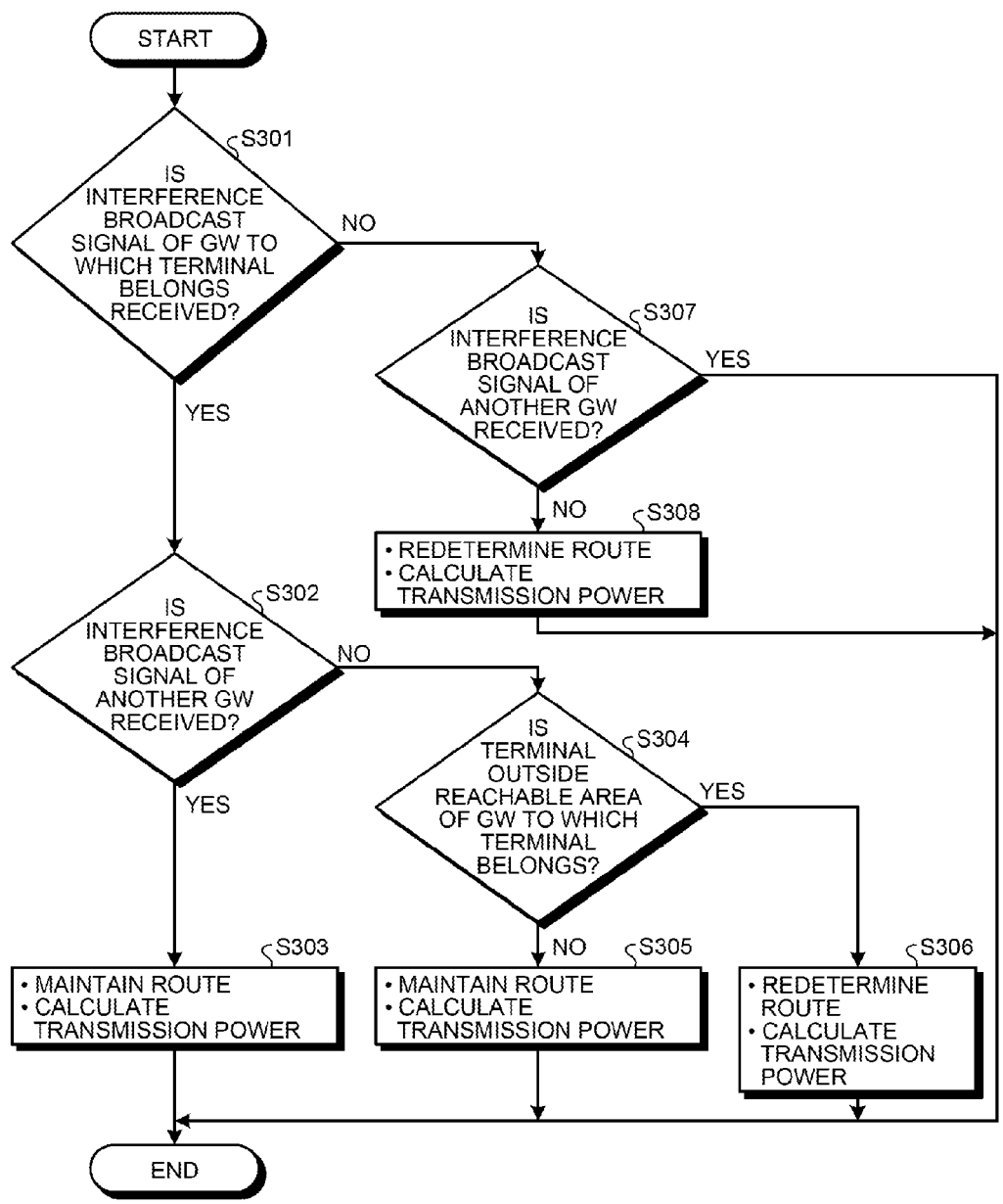
FIG. 9 is a chart for explaining a determination process of a communication route and a control process of a transmission power value of a data signal performed by the terminal.

Determination Process of Communication Route and Control Process of Transmission Power Value of Data Signal Performed by Terminal FIG. 9 is a chart for explaining a determination process of the communication route and a control process of the transmission power value of the data signal performed by the terminal.

When one of the terminals 50 has received both an interference broadcast signal from the GW 10 to which the terminal 50 belongs and an interference broadcast signal from another GW 10 (Yes at Step S301 and Yes at Step S302), the routing control unit 55 basically maintains the current communication route, that is, the direct route that is directly connected to the GW 10 to which the terminal 50 belongs (Step S303). In this case, the transmission power control unit 61 calculates a transmission power value at which the transmission signal reaches the GW 10 to which the terminal 50 belongs but does not reach the other GW 10 (Step S303).

When an interference broadcast signal is received from the GW 10 to which the terminal 50 belongs, and no interference broadcast signal is received from any other GW 10 (Yes at Step S301 and No at Step S302), the routing control unit 55 determines whether the terminal 50 is outside the reachable area of the GW 10 to which the terminal 50 belongs (Step S304).

When the routing control unit 55 determines that the terminal 50 is not outside the reachable area of the GW 10 to which the terminal 50 belongs (No at S304), the routing control unit 55 maintains the current communication route, that is, the direct route that directly connects the terminal 50 to the GW 10 to which the terminal 50 belongs (Step S305). In this case, the transmission power control unit 61 determines the first planned transmission power value included in the interference broadcast signal from the GW 10 to which the terminal 50 belongs as the transmission power value of the transmission data of the terminal 50 (Step S305).

When the terminal 50 is determined as outside the reachable area of the GW 10 to which the terminal 50 belongs (Yes at Step S304), the routing control unit 55 redetermines the communication route (Step S306). At this time, the routing control unit 55 determines, as the communication route, one alternative from a plurality of communication route alternatives including the other terminals 50 existing in the reachable area of the terminal 50 determined by the first planned transmission power value included in the interference broadcast signal from the GW 10 to which the terminal 50 belongs. The criterion for selecting one alternative from the communication route alternatives is the route cost that is calculated for each of the communication route alternatives. When no communication route alternative is found, the routing control unit 55 maintains the current communication route.

When the terminal 50 is determined as outside the reachable area of the GW 10 to which the terminal 50 belongs (Yes at Step S304), the transmission power control unit 61 determines the first planned transmission power value included in the interference broadcast signal from the GW 10 to which the terminal 50 belongs as the transmission power value of the transmission data of the terminal 50 (Step S306). When no communication route alternative is found, the routing control unit 55 maintains the current transmission power value.

When neither an interference broadcast signal from the GW 10 to which the terminal 50 belongs nor an interference broadcast signal from any other GW 10 is received (No at Step S301 and No at Step S307), the routing control unit 55 redetermines the communication route when a certain condition is satisfied (Step S308). The certain condition means that the second planned transmission power value included in the hello signal sent from the first hop terminal for the terminal 50, that is, the adjacent terminal 50 on the currently set communication route is smaller than the transmission power value that is currently set for sending the data signal of the terminal 50.

When neither an interference broadcast signal from the GW 10 to which the terminal 50 belongs nor an interference broadcast signal from any other GW 10 is received (No at Step S301 and No at Step S307), the transmission power control unit 61 determines, as the transmission power value of the terminal 50, the second planned transmission power value included in the hello signal from the adjacent terminal on the redetermined communication route (Step S308).

When no interference broadcast signal is received from the GW 10 to which the terminal 50 belongs, and an interference broadcast signal is received from another GW 10 (No at Step S301 and Yes at Step S307), the process terminates at that time.

As described above, according to the present embodiment, in the GW 10, the frame generation unit 20 sends an interference broadcast signal when the interference detection unit 15 has detected interference. This interference broadcast signal includes information on the first planned transmission power value that is the transmission power value of the data signal in the GW 10 and is smaller than the maximum transmission power value. The interference broadcast signal is sent at the maximum transmission power value.

This allows the GW 10 to broadcast to the nodes included in the maximum reachable area of the GW 10 that the interference has occurred in the GW 10. This, in turn, allows the GW 10 to notify also the interfering node of the fact that the interference has occurred, and thus to give the interfering node an opportunity to adjust the transmission power. As a result, the interference between the GWs 10 can be eliminated.

In the GW 10, when the interference detection unit 15 has detected the interference, the transmission power control unit 22 adjusts the transmission power value of the data signal in the GW 10. This adjustment sets the transmission power to a value at which the signal sent from the GW 10 does not reach the interfering node. For example, the transmission power value is calculated based on the receiving power value of the hello signal sent from the interfering node and on the known transmission power value of the hello signal.

This allows the GW 10 to eliminate interference given to other nodes by the GW 10 itself.

In the GW 10, the transmission power control unit 22 determines the transmission power value of the data signal in the GW 10 based on the interference broadcast signal sent from another GW 10. For example, the transmission power control unit 22 determines, as the transmission power value of the GW 10, the planned transmission power value of the other GW 10 included in the interference broadcast signal sent from the other GW.

This allows the GW 10 to eliminate the interference given to other nodes by the GW 10 itself. That is because the planned transmission power value of the other GW 10 included in the interference broadcast signal sent from the other GW is a power value at which the interference from the other GW 10 to the GW 10 can be eliminated.

In the GW 10, the transmission power control unit 22 assumes, as the lower limit value of the transmission power value of the GW 10, the minimum value among the required transmission power values each of which is calculated for each of the terminals 50.

This allows the GW 10 to prevent itself from being unable to communicate with any of the terminals 50.

In the GW 10, when the number of times of transmission of the interference broadcast signal based on the interference by any interfering node exceeds the certain value, the frame generation unit 20 excludes the interference broadcast signal based on the interference by the interfering node from signals to be retransmitted.

This allows the GW 10 to exclude, from signals to be retransmitted, the interference broadcast signal based on the interference by the interfering node that is unlikely to be eliminated, so that unnecessary signaling can be prevented.

In each of the terminals 50, the wireless receiving processing unit 51 and the frame receiving processing unit 54 receive the interference broadcast signal sent at the maximum transmission power from the GW 10 to which the terminal 50 belongs. The interference broadcast signal is a broadcast signal indicating that the GW 10 to which the terminal 50 belongs receives a signal sent from a node other than the first hop terminals communicating with the GW 10 to which the terminal 50 belongs via direct routes, and includes information on the planned transmission power value of the data signal in the GW 10 to which the terminal 50 belongs.

This allows the terminal 50 to know that the reachable area of the GW 10 to which the terminal 50 belongs has changed. In addition, the interference broadcast signal includes the planned transmission power value of the data signal in the GW 10 to which the terminal 50 belongs after the interference broadcast signal is sent. This enables the terminal 50 to determine whether the route needs to be changed based on the interference broadcast signal from the GW 10 to which the terminal 50 belongs. In other words, the terminal 50 can determine whether the terminal 50 is outside the reachable area of the GW 10 to which the terminal 50 belongs.

In the terminal 50, the wireless receiving processing unit 51 and the frame receiving processing unit 54 receive the hello signal sent at the maximum transmission power from a node other than the terminal 50. The hello signal includes the type information and the identification information of the other node, and information on the planned transmission power value of the data signal in the other node.

This allows the terminal 50 to determine the route based on the planned transmission power value of the other node.

In the terminal 50, when the terminal 50 is determined as outside the reachable area of the GW 10 to which the terminal 50 belongs, the routing control unit 55 identifies communication route alternatives each including, as the adjacent terminals, each of a plurality of terminals of which a required transmission power value is smaller than the planned transmission power value included in the interference broadcast signal from the GW 10 to which the terminal 50 belongs. Then, the routing control unit 55 determines, as the communication route, the route alternative having the smallest route cost among the identified route alternatives. In this case, the transmission power control unit 61 sets, as the transmission power value of the terminal 50, the planned transmission power value included in the interference broadcast signal from the GW 10 to which the terminal 50 belongs.

This allows the terminal 50 to maintain the communication with the GW 10 to which the terminal 50 belongs through the most efficient communication route, and to prevent itself from interfering the GW 10 to which the terminal 50 belongs.

In the terminal 50, when the terminal 50 is determined as included in both the reachable area of the GW 10 and the reachable area of another GW 10, the transmission power control unit 61 sets the transmission power value of the terminal 50 to a value smaller than the required transmission power value between the terminal 50 and the other GW 10.

This allows the terminal 50 to eliminate the interference given to the other GW 10 by the terminal 50.

In the terminal 50, when the terminal 50 is determined as included in neither the reachable area of the GW 10 to which the terminal 50 belongs nor the reachable area of any other GW 10, the routing control unit 55 performs the following process. That is, the routing control unit 55 identifies a plurality of route alternatives each including, as the adjacent terminals, each of a plurality of terminals of which a required transmission power value is smaller than the planned transmission power included in the hello signal from the adjacent terminal on the currently set communication route. Then, the routing control unit 55 determines, as the communication route, the route alternative having the smallest route cost among the identified route alternatives.

This allows the terminal 50 to maintain the communication with the GW 10 to which the terminal 50 belongs through the most efficient communication route regardless of any change in the state of communication with the current adjacent terminal caused by the adjustment of the reachable area by the GW 10.

[b] Other Embodiments

1. Although the first embodiment describes the terminal 50 that resets the communication route and sets the transmission power value using as a trigger the event of receiving the interference broadcast signal from any of the GWs 10, the timing of resetting the communication route and setting the transmission power value is not limited to this. For example, the terminal 50 may normally reset the communication route and set the transmission power value at certain intervals, and temporarily use as a trigger the event of receiving the interference broadcast signal from the GW 10 to reset the communication route and set the transmission power value.

2. Although the broadcast signal extraction unit 71 and the broadcast signal extraction unit 81 are described as separate functional units in the first embodiment, the configuration thereof is not limited to this. The broadcast signal extraction unit 71 and the broadcast signal extraction unit 81 may be implemented as one functional unit. In the same way, the hello signal extraction unit 72 and the hello signal extraction unit 82 may be implemented as one functional unit. The required transmission power calculation unit 73 and the required transmission power calculation unit 83 may also be implemented as one functional unit.

3. The GWs 10 and the terminals 50 of the first embodiment can be implemented by the following hardware configurations.

Figure 10:
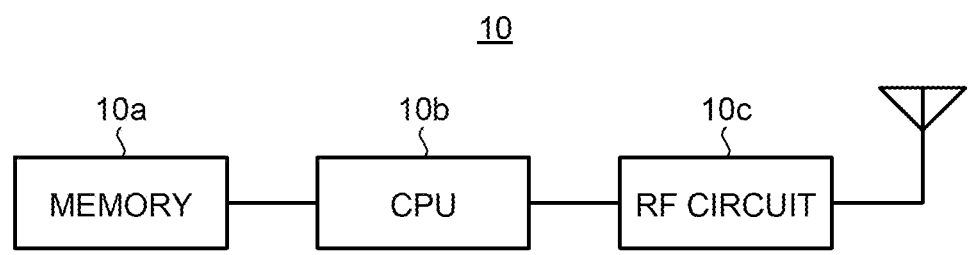
FIG. 10 is a diagram illustrating a hardware configuration of the gateway.

FIG. 10 is a diagram illustrating the hardware configuration of the gateway. As illustrated in FIG. 10, the GW 10 includes, as constituent elements of the hardware, a memory 10a, a central processing unit (CPU) 10b, and a radio frequency (RF) circuit 10c. The RF circuit 10c includes an antenna. The memory 10a is composed of, for example, a random access memory (RAM) such as a synchronous dynamic random access memory (SDRAM), a read-only memory (ROM), and a flash memory. The storage unit 16 is implemented by the memory 10a. The transmission control unit 13, the frame receiving processing unit 14, the interference detection unit 15, the broadcast signal generation unit 17, the data processing unit 18, the hello signal generation unit 19, the frame generation unit 20, and the transmission power control unit 22 are implemented by integrated circuits such as the CPU 10b. The wireless receiving processing unit 11, the carrier detection unit 12, and the wireless transmission processing unit 21 are implemented by the RF circuit 10c.

Figure 11:
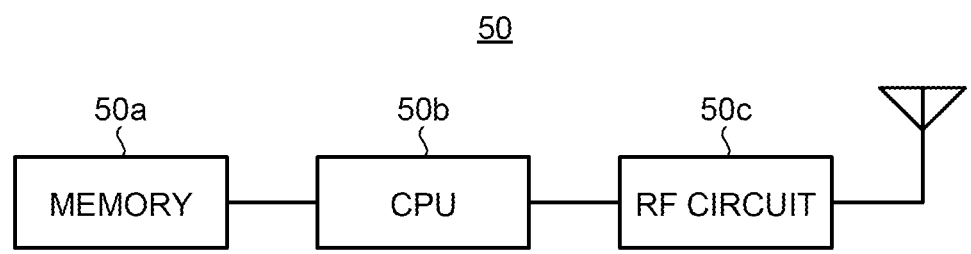
FIG. 11 is a diagram illustrating a hardware configuration of the terminal.

FIG. 11 is a diagram illustrating a hardware configuration of the multi-hop communication terminal. As illustrated in FIG. 11, the terminal 50 includes, as hardware, a memory 50a, a CPU 50b, and an RF circuit 50c. The RF circuit 50c includes an antenna. The memory 50a is composed of, for example, a RAM such as an SDRAM, a ROM, and a flash memory. The transmission control unit 53, the frame receiving processing unit 54, the routing control unit 55, the data processing unit 57, the hello signal generation unit 58, the frame generation unit 59, and the transmission power control unit 61 are implemented by integrated circuits such as the CPU 50b. The wireless receiving processing unit 51, the carrier detection unit 52, and the wireless transmission processing unit 60 are implemented by the RF circuit 50c.

The various processes described in the first embodiment can be implemented by executing prepared programs in a computer. For example, programs corresponding to the respective processes executed by the transmission control unit 13, the frame receiving processing unit 14, the interference detection unit 15, the broadcast signal generation unit 17, the data processing unit 18, the hello signal generation unit 19, the frame generation unit 20, and the transmission power control unit 22 can be recorded in the memory 10a, and the programs can be read into the CPU 10b and function as the processes. In addition, programs corresponding to the respective processes executed by the transmission control unit 53, the frame receiving processing unit 54, the routing control unit 55, the data processing unit 57, the hello signal generation unit 58, the frame generation unit 59, and the transmission power control unit 61 can be recorded in the memory 50a, and the programs can be read into the CPU 50b and function as the processes.

According to an aspect disclosed herein, interference between gateways can be suppressed, and terminals directly communicating with the gateways can maintain the communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A multi-hop communication terminal that communicates with a gateway to which the multi-hop communication terminal belongs via a communication route that is an indirect route including at least one other terminal or a direct route, the multi-hop communication terminal comprising:

a receiving unit that receives:
- a first broadcast signal that is sent at a first transmission power value from the gateway to which the multi-hop communication terminal belongs and that includes information on a first planned transmission power value of a data signal in the gateway to which the multi-hop communication terminal belongs, the first planned transmission power value being smaller than the first transmission power value; and
- a hello signal that includes type information and identification information of a node other than the terminal, and information on a second planned transmission power value of a data signal in the other node;

a routing control unit that determines the communication route based on the received first broadcast signal and the received hello signal;

a power control unit that determines a second transmission power value of a data signal in the terminal based on the received first broadcast signal, the received hello signal, and the determined communication route; and a calculation unit that calculates a path loss value between the terminal and a transmission source node of the received first broadcast signal or the received hello signal based on the received first broadcast signal or the received hello signal, and calculates a required transmission power value based on the calculated path loss value and a required receiving power value; wherein when a second broadcast signal is not received from a gateway other than the gateway to which the multi-hop communication terminal belongs, and when the first planned transmission power value is larger than the required transmission power value between the terminal and the gateway to which the multi-hop communication terminal belongs that has been calculated by the calculation unit, the power control unit determines the first planned transmission power value as the second transmission power value.

2. A multi-hop communication terminal that communicates with a gateway to which the multi-hop communication terminal belongs via a communication route that is an indirect route including at least one other terminal or a direct route, the multi-hop communication terminal comprising:

a receiving unit that receives:
- a first broadcast signal that is sent at a first transmission power value from the gateway to which the multi-hop communication terminal belongs and that includes information on a first planned transmission power value of a data signal in the gateway to which the multi-hop communication terminal belongs, the first planned transmission power value being smaller than the first transmission power value; and
- a hello signal that includes type information and identification information of a node other than the terminal, and information on a second planned transmission power value of a data signal in the other node;

a routing control unit that determines the communication route based on the received first broadcast signal and the received hello signal;

a power control unit that determines a second transmission power value of a data signal in the terminal based on the received first broadcast signal, the received hello signal, and the determined communication route; and a calculation unit that calculates a path loss value between the terminal and a transmission source node of the received first broadcast signal or the received hello signal based on the received first broadcast signal or the received hello signal, and calculates a required transmission power value based on the calculated path loss value and a required receiving power value; wherein when a second broadcast signal is not received from a gateway other than the gateway to which the multi-hop communication terminal belongs, and when the first planned transmission power value is smaller than the required transmission power value between the terminal and the gateway to which the multi-hop communication terminal belongs that has been calculated by the calculation unit, the routing control unit identifies a plurality of route alternatives each including, as an adjacent terminal, each of a plurality of terminals of which the required transmission power value calculated by the calculation unit is smaller than the first planned transmission power value, and sets, as the communication route, the route alternative having smallest route cost among the identified route alternatives; and the power control unit determines the first planned transmission power value as the second transmission power value.

3. A multi-hop communication terminal that communicates with a gateway to which the multi-hop communication terminal belongs via a communication route that is an indirect route including at least one other terminal or a direct route, the multi-hop communication terminal comprising:

a receiving unit that receives:
- a first broadcast signal that is sent at a first transmission power value from the gateway to which the multi-hop communication terminal belongs and that includes information on a first planned transmission power value of a data signal in the gateway to which the multi-hop communication terminal belongs, the first planned transmission power value being smaller than the first transmission power value; and
- a hello signal that includes type information and identification information of a node other than the terminal, and information on a second planned transmission power value of a data signal in the other node;

a routing control unit that determines the communication route based on the received first broadcast signal and the received hello signal; and a power control unit that determines a second transmission power value of a data signal in the terminal based on the received first broadcast signal, the received hello signal, and the determined communication route, wherein the receiving unit receives a second broadcast signal from a gateway other than the gateway to which the multi-hop communication terminal belongs;

the multi-hop communication terminal further comprises a calculation unit that calculates a path loss value between the terminal and a transmission source node of the received first broadcast signal, the received second broadcast signal, or the received hello signal based on the received first broadcast signal, the received second broadcast signal, or the received hello signal, and calculates a required transmission power value based on the calculated path loss value and a required receiving power value; and the power control unit determines the second transmission power value to be a value smaller than the required transmission power value between the other gateway and the terminal that has been calculated by the calculation unit.

4. A multi-hop communication terminal that communicates with a gateway to which the multi-hop communication terminal belongs via a communication route that is an indirect route including at least one other terminal or a direct route, the multi-hop communication terminal comprising:

a receiving unit that receives:

a first broadcast signal that is sent at a first transmission power value from the gateway to which the multi-hop communication terminal belongs and that includes information on a first planned transmission power value of a data signal in the gateway to which the multi-hop communication terminal belongs, the first planned transmission power value being smaller than the first transmission power value; and a hello signal that includes type information and identification information of a node other than the terminal, and information on a second planned transmission power value of a data signal in the other node;

a routing control unit that determines the communication route based on the received first broadcast signal and the received hello signal; and a power control unit that determines a second transmission power value of a data signal in the terminal based on the received first broadcast signal, the received hello signal, and the determined communication route; and a calculation unit that calculates a path loss value between the terminal and a transmission source node of the received hello signal based on the received hello signal, and calculates a required transmission power value based on the calculated path loss value and a required receiving power value; wherein when neither the first broadcast signal from the gateway to which the multi-hop communication terminal belongs nor a second broadcast signal from a gateway other than the gateway to which the multi-hop communication terminal belongs is received, the routing control unit identifies a plurality of route alternatives each including, as an adjacent terminal, each of a plurality of terminals of which the required transmission power value calculated by the calculation unit is smaller than the second planned transmission power included in the hello signal sent from the adjacent terminal on the currently set communication route, and sets, as the communication route, the route alternative having smallest route cost among the identified route alternatives.

* * * * *